Figure 1:
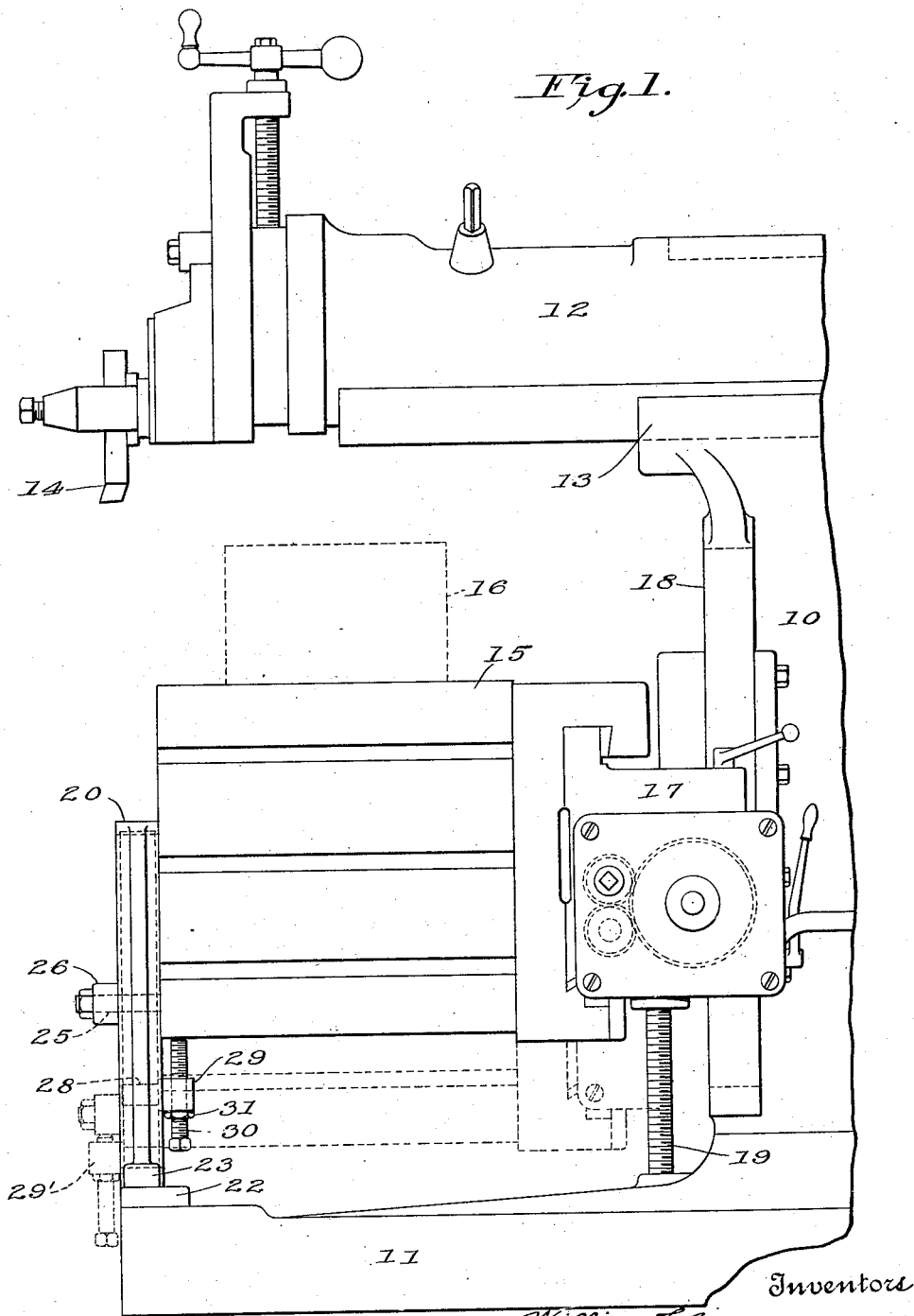

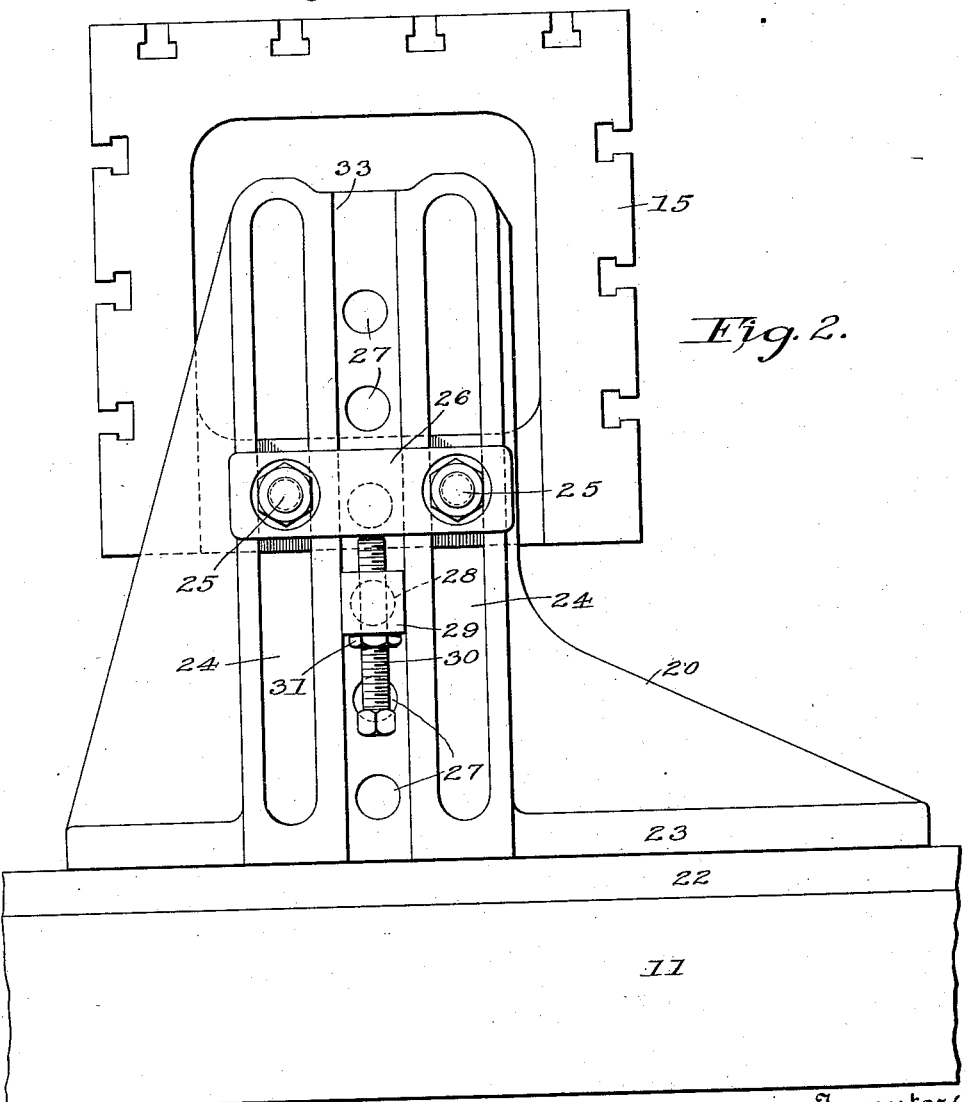

Patented Feb. 2, 1932

1,843,795

UNITED STATES PATENT OFFICE

WILLIAM F. ZIMMERMANN, OF MAPLEWOOD, AND JOHN J. DUFFY, OF NEWARK, NEW JERSEY, ASSIGNORS TO GOULD & EBERHARDT, OF NEWARK, NEW JERSEY, A CORPORATION OF NEW JERSEY

TABLE SUPPORT FOR SHAPING MACHINES

Application filed September 17, 1927. Serial No. 220,108.

This invention is concerned with certain novel improvements in work table supports of the type commonly employed in shaper machine tools.

The usual construction in shapers includes a table normally adapted to receive a step by step horizontal movement relative to the cutter tool mounted on a constantly reciprocating ram positioned above the work table. Provision is also made for varying the vertical position of the table.

The main support for the table includes a cross rail mounted on the forward face of the frame with the table mounted on the cross rail for horizontal movement therealong. Vertical translation is accomplished by adjusting the cross rail along vertical ways on the supporting frame.

In the interests of rigidity, smoothness of operation, and precision, it is necessary to provide the outer or overhanging end of the table with an additional and local support guide. A heretofore common construction has included a vertical supporting bracket adapted to be clamped to the table and movable therewith across the base of the machine. Vertical slots adapted to receive clamping bolts attached to the outer end of the table made provision for vertical adjustment thereof.

The above construction, when very securely clamped, provides ample support, but under continued operation of the machine it has been discovered that owing to the constant hammering and strains caused by the intermittent and sudden engagement of the tool with the work there is a decided resultant tendency of the coacting parts to slip and of the clamping bolts to become loose, resulting eventually in practically a total loss of support guide for the outer end of the table and the attendant vibration and inaccuracies of operation.

A close analysis of this situation has resulted in the conception and development of the novel and practical additional means disclosed herein for providing a reliable support guide capable of permanently and positively holding the table in any of its adjusted positions under the most severe conditions of operation.

The invention in its general features consists of a stress receiving block adapted to be positioned in any one of a series of vertically spaced holes formed in the supporting bracket. The block bears against an under portion of the table and thereby receives the vertical thrust, relieving the clamping bolts of such stresses.

The novel features of the device in its co-operation with the machine tool construction in which it is incorporated includes a screw stud adjustably mounted and adapted to be locked in the supporting block with the stud bearing against the table. Thus, a finer adjustment is obtained as an adjunct to the relatively coarse adjustment permitted by the selective positioning of the block in the series of holes. The screw stud provides a fine adjustment for locating the positive support with respect to the outer end of the table, the device as a whole resulting in a compact, reliable support and one which, owing to its sole vertical point of contact, is not liable to become loosened by the constant hammering of the cutting tool.

The objects of the invention include the provision of a supporting device having as prominent features thereof simplicity of design and ease and rapidity of adjustment.

Still further objects are manifest in the construction of the bracket which has certain features of symmetry enabling the table supporting block to be inserted on either side thereof. This is made especially desirable in case the nature of the work makes it necessary to lower the table to such a point that there would be insufficient space to insert the bearing block between the table and the machine base.

Other objects and advantages will be in part indicated in the following description and in part rendered apparent therefrom in connection with the annexed drawings.

To enable other skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a view in elevation of a portion of a shaper machine tool showing the table support means at the left thereof. Fig. 2 is an enlarged front elevational view of the supporting bracket and coupling details and Fig. 3 is a top plan view thereof.

The invention is shown incorporated in a shaper machine tool; the more general and conventional elements of which consist of a frame 10 mounted on a base 11 and having the ram 12 reciprocably mounted in the ways 13 on the upper portion of the machine tool. The ram 12 carries the usual adjustable cutting tool 14 at the outer end thereof.

The main supporting means for the work table 15, adapted to carry the work-piece conventionally shown at 16, comprises the cross rail 17 mounted on the vertical ways 18 and adapted by means of the screw 19 to be adjusted vertically along the supporting ways 18. The work table is adapted to be translated horizontally along the cross rail by any convenient means which may be either manual or automatic; such devices being well known in shapers and it is, therefore, not deemed necessary to illustrate and describe any particular device for the purpose herein.

The features with which this invention is particularly concerned relate to the support guide for the outer or overhanging end of the work table. The main element of the outer support consists of a bracket 20 adapted to be clamped to the outer end of the table to move horizontally therewith as the table is translated along the cross rail 17. A plane bearing plate 22, affixed to the base 11, provides a bearing surface along which the lower sliding plate 23 integral with the bracket 20 may slide easily as the table and bracket receive their horizontal movement along the cross rail. The bracket 20 has machined therein the vertical slotted openings 24 which are adapted to receive the studs 25 fixed in the work table 15. A plate 26 fits over the outer ends of the clamping bolts 25 and may be clamped into position against the supporting bracket 20 by means of suitable nuts on the outer ends of the studs 25.

The elements thus far described are more or less conventional and are well known in the construction of machine tools. To relieve the clamping bolts 25 of the vertical strains and constant hammering to which they would be subjected ordinarily in a machine of this type, an auxiliary vertical supporting means has been provided to co-operate therewith and consists of a series of vertically spaced holes 27 drilled through the bracket 20. These holes are adapted to receive and support a shank 28 projecting from the supporting block 29. The shank 28 and holes 27 are machined to a comparatively close fit to prevent any shake or sag of the block 29, at the same time permitting the shank 28 to be quickly and easily withdrawn and shifted to another hole corresponding to the vertical position to which the table 15 has been adjusted. The bearing block 29 has adjustably mounted therein the screw stud 30 provided with the locking nut 31; such stud providing for a fine adjustment of the supporting means as an addition to the relatively coarse adjustment provided by the series of vertically spaced holes 27. To render the vertical support more rigid and free from danger of the stud and block 29 revolving on the shank 28, the bracket 20 is provided with the vertically extending recesses 32 and 33, such recesses being rectangular in shape and adapted to receive the rectangularly shaped block 29 therein.

It may be readily seen that the bearing block 29 and stud 30 form a substantial and reliable means for vertically supporting the table 15 and one which is in no danger of becoming loose or out of adjustment through the severe shocks transmitted to the supporting means as a result of the intermittent and sudden impacts of the tool 14 with the work 16 mounted on the table.

The device illustrated herein permits of a very fine and accurate adjustment of the support for the outer end of the table; the table being first vertically adjusted along the ways 18 and clamped to the bracket and thereafter the block 29 is moved to the nearest approximate hole 27 and the screw stud 30 is turned into contact with the table 15 to positively support it and prevent any sag of the outer end thereof. The clamping bolts 25 are relieved of the vertical force and the supporting block 29 by reason of its particular mounting and single vertical contact with the table receives only vertical forces and therefore has no tendency to become loosened. The construction thus provides a stress resisting member which acts as a positive stop and one which does not disturb an adjustment after it has been accurately made. This latter feature results from the fact that the organization permits the table to be clamped to the vertical bracket in its adjusted position prior to adjustment of the stop member into engagement with the table.

Normally the block 29 would be positioned on the inner side of the bracket as shown in Figure 1, but should it be necessary by reason of the particular nature of the work to lower the table to the position shown in dotted lines in Figure 1, then the space between the table 15 and the base 11 would be too small to permit the use of a bearing block 29 on the inner face of the bracket 20. The simple construction of this device permits of a way in which to avoid this and as shown by the position of the block 29' in Fig. 1, or, as shown in full lines in Figs. 2 and 3, the screw 30 in this position being adapted to bear against the outer plate 25 of the clamping means.

While the novel supporting means shown herein is shown applied to and is especially adapted to a shaper machine because of the nature of the operation of such a machine, yet it is to be understood that the invention is capable of application in machine tools of other types wherein it is desirable to supply an overhanging table with a very reliable, easily, and closely adjustable support.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims.

Having thus revealed this invention, we claim as new and desire to secure the following combinations and elements, or equivalents thereof, by Letters Patent of United States:—

1. A shaper combining a frame; a work table adjustably mounted thereon; and a support for the outer end of said table comprising a bracket having vertical slots therethrough, clamping bolts attached to said table adjustable along said slots, there being a series of vertically spaced openings between said slots, an adjustable bearing member having a portion adapted to be supported in any one of said openings, and screw means in said bearing member adapted to be adjusted into engagement with an under portion of said table after said clamping bolts have been tightened.

2. A table support guide for shapers combining a bracket adapted to be positioned adjacent the outer end of the table and slidable across the shaper base; means for vertically adjusting said table relative to said bracket; means for clamping the table in its adjusted positions to said bracket; and means for positively locking the table against downward displacement on the bracket comprising a series of vertically spaced openings, a bearing member having a projecting portion engageable in any one of said openings, and means carried by said member vertically adjustable into engagement with said table after the table has been clamped to said bracket.

3. A shaper combining a work table adjustably mounted thereon; and supporting means for the other end of said table comprising a slidably mounted vertical bracket, means for clamping said table to the bracket in vertically adjusted positions there being a series of vertically spaced holes in said bracket, and a removable member having a shank selectively insertable in said holes and thereby adapted to positively support said table in its corresponding adjusted positions.

4. An adjustable support for machine tool work tables comprising a bracket having a pair of vertical slots therethrough adapted to receive clamping bolts, there being a series of vertically spaced openings arranged between said slots; and a supporting member having a portion positionable in any one of said openings adapted to form a direct bearing for positively supporting said table in vertically adjusted positions.

5. A table support for machine tools combining a bracket adapted to be positioned adjacent an overhanging end of said table and having a vertical recess therein and having a series of horizontal holes opening into said recess; and an adjustable supporting member mounted on said bracket comprising a block portion adapted to fit in said recess, a shank attached thereto selectively insertable in any one of said holes and an adjustable screw stud in said block adapted to receive vertical forces transmitted thereto from the table.

6. A support for machine tool work tables combining a bracket adapted to be arranged adjacent one end thereof, there being a series of horizontal holes vertically spaced therein; a removable supporting block having a shank adapted to be selectively positioned in any one of said holes and with the supporting block arranged on either side of said bracket; and adjustable screw means in said block adapted to act as a vertical support for the table.

7. A machine tool combining a frame; a work table supported at one end thereon; a bracket arranged adjacent the other end of said table; means for vertically adjusting said table relative to said frame and bracket; means for clamping said table to the bracket in adjusted positions; and screw threaded means associated with said bracket and adapted to be vertically adjusted into engagement with an under-surface rigid with the table after the table has been clamped whereby a positive vertical support is provided without disturbing the adjusted position of the table.

8. A shaper tool combining a base portion; a frame; a table vertically adjustable and transversely slidable on said frame; and means for guiding and supporting the outer end of said table in vertically adjusted positions comprising a bracket slidably mounted on said base, a bolt and slot connection between said bracket and table to clamp the table in vertically adjusted positions thereof to said bracket, a series of vertically spaced means carried by said bracket, a stop member selectively engageable with said spaced means, and screw threaded means located between said member and an under surface of said table and adjustable into contact with the latter after said table is clamped whereby a positive vertical support is provided capable of being accurately positioned without disturbing the adjusted position of the table.

9. A shaper combining a main frame including a base; a table mounted on the side of said frame; means for vertically adjusting said table; means for horizontally adjusting said table; and means for supporting the outer end of said table comprising a bracket, means for clamping said table in vertically adjusted positions thereof to said bracket, a series of vertically spaced means on said bracket, a stop member selectively engageable with said spaced means and adapted to be positively supported in the various positions thereon, screw threaded means located between said member and an under surface of said table whereby a positive vertical support is provided capable of being accurately adjusted into engagement with said table without disturbing the previously clamped position thereof, and said bracket being mounted for slidable movement across said base whereby the outer end supporting means is effective during horizontal movement of said table.

In witness whereof, we have hereunto subscribed our names.

WILLIAM F. ZIMMERMANN.
JOHN J. DUFFY.